May 14, 1968 W. A. NIKKEL 3,383,234
APPLICATOR ROLL WITH METERING MEANS
Filed Aug. 31, 1964 4 Sheets-Sheet 1
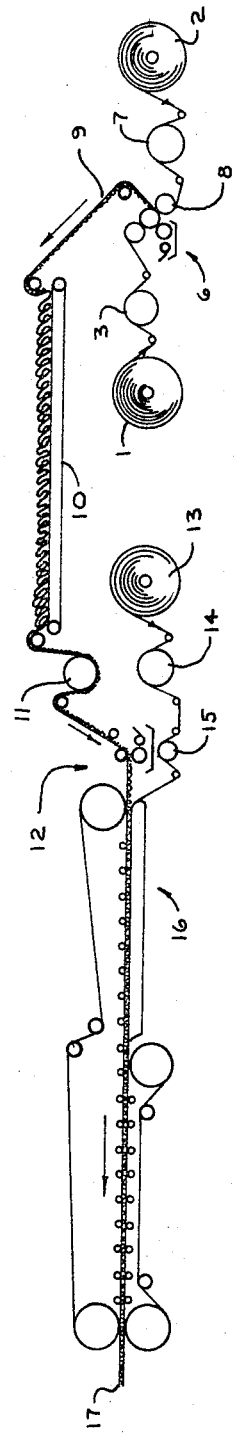
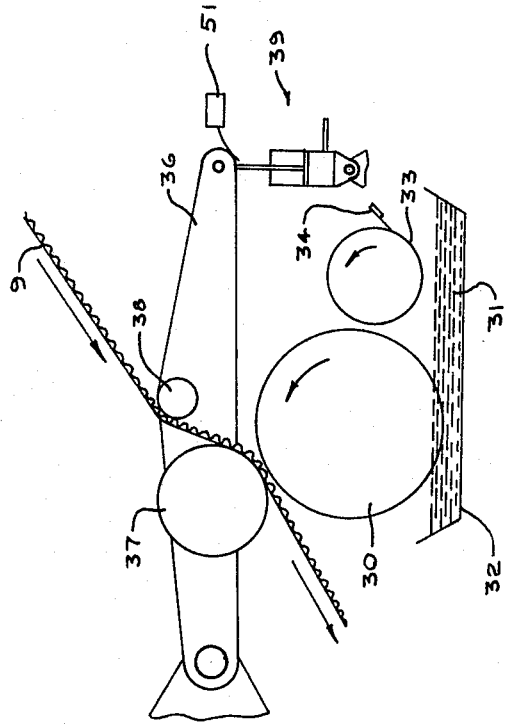
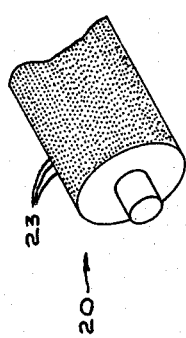
INVENTOR.
Willem A. Nikkel
BY
Thomas W. Flynn
ATTORNEY May 14, 1968   W. A. NIKKEL   3,383,234
APPLICATOR ROLL WITH METERING MEANS
Filed Aug. 31, 1964   4 Sheets-Sheet 2

INVENTOR.
Willem A. Nikkel
BY
Thomas W. Flynn
ATTORNEY

May 14, 1968  W. A. NIKKEL  3,383,234

APPLICATOR ROLL WITH METERING MEANS

Filed Aug. 31, 1964  4 Sheets-Sheet 3

INVENTOR.
Willem A. Nikkel
BY
*Thomas W. Flynn*
ATTORNEY

May 14, 1968  W. A. NIKKEL  3,383,234
APPLICATOR ROLL WITH METERING MEANS
Filed Aug. 31, 1964  4 Sheets-Sheet 4

INVENTOR.
Willem A. Nikkel
BY
Thomas W. Flynn
ATTORNEY

United States Patent Office 3,383,234
Patented May 14, 1968

3,383,234
APPLICATOR ROLL WITH METERING MEANS
Willem A. Nikkel, Bellmawr, N.J., assignor, by mesne assignments, to Samuel M. Langston Company, Camden, N.J., a corporation of New Jersey
Continuation-in-part of application Ser. No. 275,908, Apr. 26, 1963. This application Aug. 31, 1964, Ser. No. 393,161
2 Claims. (Cl. 117—37)

ABSTRACT OF THE DISCLOSURE

A doctor roll is spaced .005 to .016 inches from an adhesive applicator roller having discrete cells on its periphery to control the amount of adhesive in the cells and substantially remove all adhesive from the surface of the applicator roller.

This application is a continuation-in-part of Ser. No. 275,908, filed April 26, 1963, and now abandoned.

The present invention is directed to the manufacture of corrugated board and more specifically, to the application of the adhesive to a web of corrugated material prior to the bonding of a web of liner material to one or both sides thereof.

The present invention is, therefore, most particularly concerned with those stages in the manufacture of corrugated board generally referred to as the single face and double backer operations. In a conventional single face operation, a web of core material is passed through a pair of intermeshing corrugating rolls where a series of corrugations or flutes are formed in the web. The corrugated web or medium is thereafter retained in the corrugations of one of the corrugating rolls for a short distance, then allowed to spring or fluff out from the corrugations to contact the surface of the applicator roll where adhesive is applied to the flute tips of the medium. The corrugated medium, with adhesive applied, is then forced back into the corrugations of the roll and passes through a nip formed by the corrugating roll and a second, pressure roller where it is united under pressure to a web of uncorrugated liner material. The resulting laminated web of corrugated medium and liner material, generally referred to as single faced board, is then conveyed to a storage bridge preparatory to the bonding of a second, or outside liner, thereto in the double backer operation.

In the double backer operation, the single faced board is passed through a pressure nip formed by a rider roll and an adhesive applicator roll where adhesive is applied by the applicator roll to the flute tips of the medium opposite the inside liner. The single face board and a web of outside liner material then pass through a hot plate section where they are joined under heat and pressure.

In both the operations described above, conventional practice is to utilize a smooth or slightly roughened surfaced adhesive applicator roll rotating in a pan of adhesive and contacting the flute tips of the medium as the medium is conveyed past the roll. Again, in both operations, the usual practice is to utilize a reduction gearing system, referred to as a tapered drive, to maintain the surface speed of the applicator below that of the medium to obtain a wiping or smearing of the adhesive onto the flute tips. As an aid in controlling the amount of adhesive applied to the medium, a doctor blade or roller is provided with the clearance between the doctor device and the applicator roll adjusted to give the desired thickness of film on the surface of the applicator roll.

In the double backer operation, as the single faced board is passed between the rider roll and applicator roll the pressure at this nip is resisted mainly by the structural strength of the medium. Hence, care must be taken to maintain this pressure below that which will crush the medium; yet the pressure must be great enough to insure adhesive transfer adequate to subsequently bond the outside liner to the medium. Generally, to obtain this median pressure the clearance between the rider roll and applicator roll is set at that which will give the desired pressure for the caliper of single faced board to be manufactured.

While the practices outlined above are widely followed, many inherent disadvantages exist in this type of system. For example, because the adhesive must be wiped or smeared onto the medium to obtain sufficient transfer, a much larger area of the flute is covered than is actually necessary. Thus, rather than adhesive being applied only at the point of subsequent contact between the medium and the liner, a substantially larger area is covered with consequent adhesive waste. Additionally, the larger application area enhances the rate of adhesive penetration into the somewhat porous medium and results in increased losses through absorption. Further, the use of a tapered drive to maintain the applicator roll surface speed below that of the medium necessitates additional equipment, which, besides being a possible source of malfunction, must be carefully adjusted to insure a fairly constant rate of adhesive transfer during speed fluctuations in the corrugated board manufacturing process. Another undesirable feature of utilizing a smooth or slightly roughened surface applicator roll carrying a surface layer of adhesive is the tendency of the adhesive to be slung from the surface of the roll at high speeds.

Many of these disadvantages can be overcome by utilizing an applicator roll of the type disclosed in my copending application, Serial No. 275,908. This type of roll, rather than having a smooth or slightly roughened surface, is provided with a plurality of shallow cells formed in its surface. As the applicator rotates in a reservoir of adhesive, the shallow cells are each filled with adhesive and any surface film adhering to the rolls wiped off by means of a doctor blade. As the applicator contacts the flute tips, the adhesive is printed thereon in a series of small, discrete masses of adhesive. Since the cells, and hence, the masses of adhesive, are closely spaced and the adhesive still flowable, the small masses of adhesive join to form a continuous, unbroken line of adhesive extending the length of the flute at its tip. Due to the fact that the adhesive is printed rather than wiped onto the flute, the area of adhesive application is confined to the exact point on the medium where it is needed for subsequent adhesion of the liner thereto and adhesive waste is avoided. Additionally, the necessity of utilizing a tapered drive to obtain wiping is eliminated and the applicator roll is conveniently run at one to one ratio with the medium actually driving the roll through frictional contact. It should also be noted that because the adhesive is confined within the small cells, any tendency of the adhesive to sling from the roll at high speeds is eliminated.

While all of these advantages accrue through the use of a celled applicator roll it has been found that further improvement may be made to obtain additional advantageous results. Thus, as noted above, in my said copending application a doctor blade is utilized to scrape the surface film of adhesive from the roll. It has been found, however, that the scraping action of the blade does not always entirely remove excess adhesive from the roll surface. Additionally, the scraping of the blade subjects the roll to an abrasive action which may eventually require replacement or reworking of the roll. As disclosed in my said copending application, the celled applicator roll is used at a double backer station. In this environment, the rate of adhesive consumption is controlled by varying the pressure exerted on the single face board by the rider roll and applicator roll and the medium of the single faced board is thereby caused to press into the cells of the roll to a greater or lesser extent and draw more or less adhesive from the cells. While the rate of adhesive consumption may, in this manner, be varied approximately 60%, difficulties may arise through board caliper variations and limitations on nip pressures imposed by the structured strength of the medium. For example, if a fixed clearance is maintained between the rider roll and applicator roll, any variation in board caliper will affect the nip pressure. Thus, if board of higher than desired caliper passes through the nip, the medium may be crushed. Conversely, if a portion of the board is thinner than desired, the nip pressure may be insufficient to obtain adequate adhesive transfer. In either case, of course, board of inferior strength is likely to be produced. This situation is further complicated where a portion of the board has one edge of high caliper tapering transversely to an opposite edge of low caliper. In this case, the thick edge of the board will be crushed and the thin edge receive insufficient adhesive.

Through invention of the present application, however, all of the advantages of using a celled applicator roll are still obtained while the limitations noted above are obviated. Thus, in the present invention, a celled applicator roll is utilized as in my prior application, but rather than a doctor blade, a rotating doctor roll, spaced from the applicator roll is provided. Contrary to what might be expected, and for reasons not fully analyzed, maintaining a clearance between the doctor roll and the applicator roll does not result in a surface film on the roll but instead, substantially completely cleans the surface of the roll. Further, by varing the gap or clearance between the doctor roll and applicator roll, not only may the surface of the roll be maintained substantially free of adhesive, but the quantity of adhesive in the cells may be carefully controlled. It will be seen, therefore, that not only is surface wearing of the applicator roll avoided by completely eliminating any contact by the doctor device, but a positive control of the rate of adhesive consumption is provided through metering of the amount of adhesive in the cells of the applicator roll.

Through a further feature of the present invention this unique means of adhesive metering may be combined with a pressure control system at the double backer station to insure adequate adhesive transfer without danger of flute crushing despite variations in board caliper in either the machine or cross machine directions.

These and other features advantages of the present invention will become more readily apparent from the following detailed description wherein:

FIGURE 1 is a somewhat schematic view of the corrugating process;

FIGURE 3 is a view of the adhesive applicating station at the double backer;

FIGURE 4 is a perspective view of a portion of a celled applicator roll;

Figure 2:
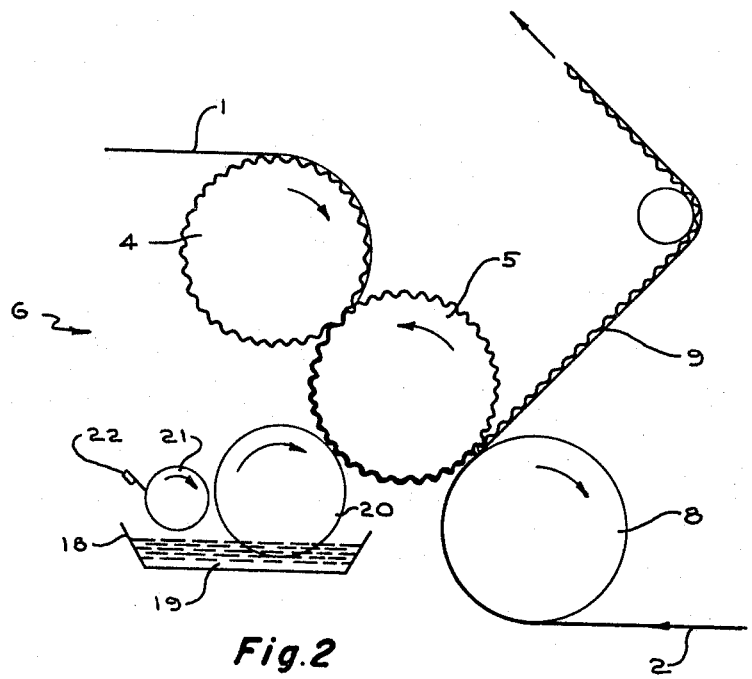
FIGURE 2 is a view of the adhesive applicating station at the single facer.

Referring to FIGURE 1 of the drawings, corrugating apparatus is shown which, with the exception of features of the present invention, is for the most part conventional. Thus, a pair of unwind stands may be provided, supporting rolls of corrugating medium 1 and liner material 2. Corrugating medium 1 is passed over a preheater 3 and thence, between a pair of intermeshing corrugating rollers 4 and 5, where a series of flutes or corrugations is formed therein. The medium 1 is retained in the corrugations of roll 5 as it is conveyed past an adhesive applicator station 6, where a series of closely spaced, discrete masses of adhesive are printed on the flute tips thereof. Simultaneously, liner material 2 is trained over preheater 7 and thence around pressure roll 8 forming a nip with roll 5 where the liner and medium are joined to form single faced board 9. Board 9 is then conveyed to storage bridge 10 where it is accumulated prior to joining a second, or outside liner thereto. From storage bridge 10 the single faced board is trained over preheater 11 and thence, past a second adhesive applicator station 12 where a second series of closely spaced, discrete masses of adhesive are applied to the flute tips of the medium opposite the layer of liner material. A roll of outside liner material 13 is trained over preheaters 14 and 15 and thence, to a hot plate section 16 where it is joined under heat and pressure to the single faced board to form double faced board 17.

Figure 5:
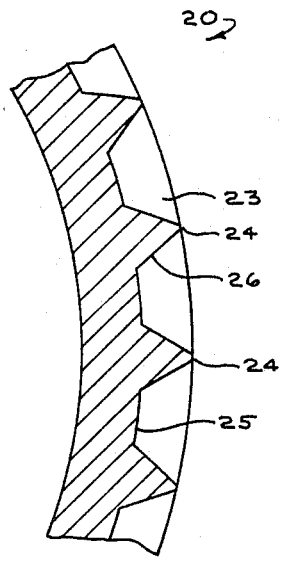
FIGURE 5 is a sectional view of a portion of the applicator roll.

Turning now to FIGURES 2 and 4–7 of the drawings, the adhesive applicator station 6 will be described in detail. As seen in FIGURE 2, the adhesive applicator station 6 includes a reservoir 18 of adhesive 19 with a portion of the applicator roll 20 submerged in the adhesive. A doctor roll 21 is positioned in spaced relation to the applicator roll 20 and a scraper blade 22 may be provided to clean the surface of the doctor roll. Referring to FIGURES 4 and 5 it will be seen that the applicator roll 20 is provided with a plurality of small, closely spaced cells 23 in its surface 24 with each cell conveniently formed as a truncated pyramid exhibiting a bottom wall 25 and sloping side walls 26.

Figure 6:
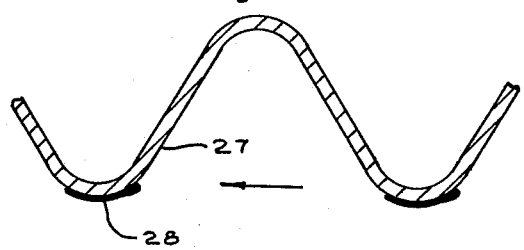
FIGURE 6 is a view of medium having adhesive applied thereto according to the prior art.

In conventional single face operations, as the medium leaves the nip formed by the intermeshing corrugating rolls, it is allowed to spring away from the surface of the roll carrying it, or fluff out, to contact the smooth or slightly roughened surface of an applicator roll where a quantity of adhesive is wiped or smeared on the flutes thereof. The effect of this wiping action is seen in FIGURE 6 where a web of corrugating medium having flutes 27 is shown, traveling in the direction indicated by the arrow. As a smooth surfaced roller having a surface film of adhesive contacts the flute tips, the adhesive is wiped or smeared thereon, leaving an unsymmetrical mass 28 covering an appreciable portion of the flute tip.

Figure 7:
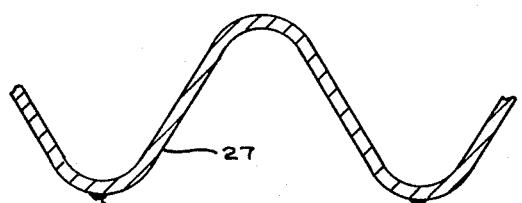
FIGURE 7 is a view of medium having adhesive applied thereto with a celled applicator roll.

In contrast, where a celled applicator roll is used, the medium may be retained in the corrugations of the roll and the surface speed of the roll and that of the medium maintained substantially equal. In this manner the adhesive is printed as shown in FIGURE 7, on the exact tip of each flute 27 leaving a small, substantially symmetrical mass of adhesive 28 deposited thereon.

In order to obtain the optimum benefits of a celled, as opposed to a smooth, surfaced applicator roll, the surface of the roll should be maintained free of adhesive and all adhesive carried within the cells of the roll. One manner of achieving this is, as disclosed in my said copending application, by utilizing a doctor blade scraping the surface of the roll. It will be apparent, however, that this scraping action has an abrading effect on the applicator roll surface and will eventually require replacement or refinishing of the roll. Additionally, as noted previously, it has been found that a doctor blade does not always satisfactorily remove the surface film from the roller. These disadvantages, however, are eliminated by means of the present invention. As seen in FIGURE 2, the roller 21 is rotated with its surface spaced apart from that of the applicator roll 20. If roller 20 had a smooth or slightly roughened surface, spacing roller 21 from its surface would, as expected, leave a surface layer of adhesive on the applicator with the thickness of the layer varying directly with the degree of spacing. When using a celled applicator roll, however, an entirely different phenomenon is observed. Thus, with the roller 21 spaced from the celled surface of the applicator roll, the surface 24 of the roll is substantially cleaned of all surface adhesive. Further, by varying the distance at which the roller 21 is spaced from the roll 20, the amount of adhesive retained within the individual cells may also be varied.

Figure 14:
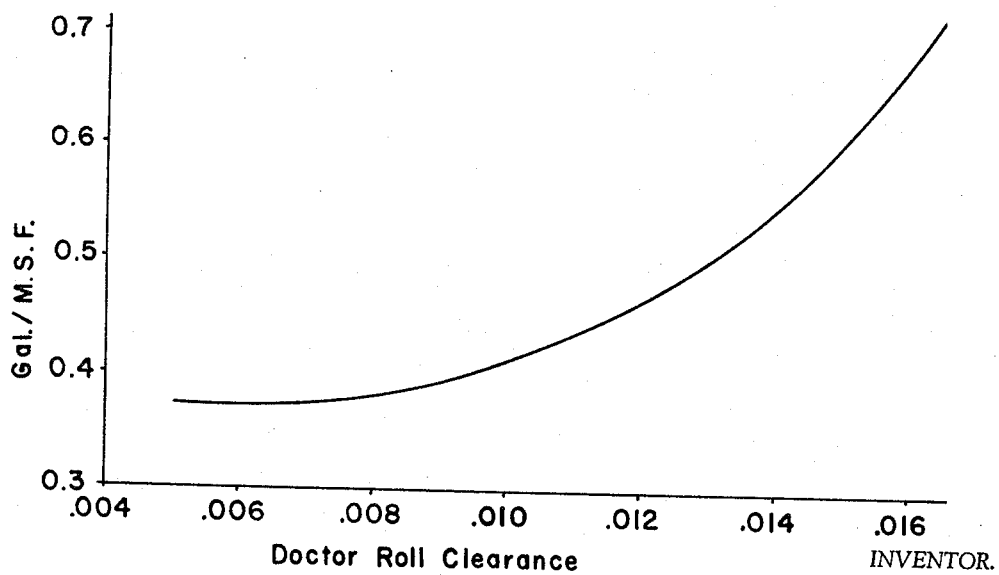
FIGURE 14 is a graph showing rate of adhesive consumption with varying doctor roll clearances.

This is perhaps best illustrated in FIGURE 14 where adhesive consumption is plotted against roll clearance for a B flute type medium and an adhesive having a viscosity of 30 Stein-Hall seconds. While the relationship is not a straight-line one, it will be seen that as the roll clearance is gradually increased from approximately 5–6 one-thousandths of an inch up to approximately 16 thousandths of an inch, the rate of adhesive consumption also gradually increases from about .325 gallons per thousand square feet of board to approximately .675 gallons per M square feet. Thus, it will be seen that by varying the doctor roll-applicator roll clearance, and hence, the amount of adhesive retained in the individual cells of the applicator roll, adhesive consumption rate can be varied over a range in excess of 100%. With the particular apparatus observed, it was also found that above approximately 16 thousandths of an inch, a surface film will again begin to appear on the applicator roll, while below this value, the surface of the roll was, of course, substantially free of adhesive.

It will thus be seen that by utilizing a doctor roll spaced from the surface of the celled applicator roll, not only may the surface of the applicator roll be maintained substantially free of surface film without wearing of the roll, but a positive control of adhesive consumption is provided.

Figure 11:
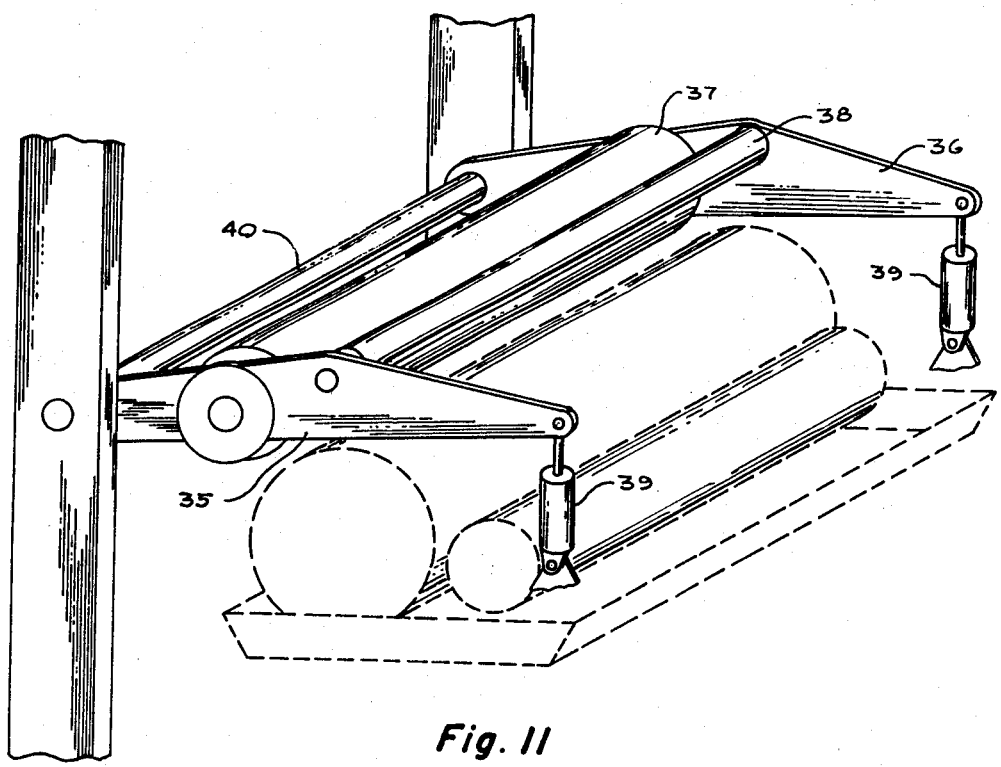
FIGURE 11 is a perspective view of the adhesive applicator system at the double backer.

Turning now to FIGURE 3 of the drawings there will be seen the adhesive applicator station 12, where adhesive is applied to the flute tips of the single faced board. As shown in FIGURE 3, station 12 includes a celled applicator roll 30, similar to roll 20, and rotating in a supply of adhesive 31 contained in reservoir 32. As in the case of the single face applicating station 6, a roll 33, provided with a scraper blade 34, is rotated in spaced relation to the surface of the applicator roll 30; thereby maintaining the surface of roll 30 free from adhesive and providing a positive means of controlling the amount of adhesive in the cells thereof. As seen in FIGURE 11, a pair of arms 35 and 36 extend from fixed frame members and support, intermediate their lengths, a rider roll 37 and flexing roll 38. At their outer ends each arm is pivotally attached to the piston rod of a piston and cylinder arrangement 39, which in turn is pivotally attached at its lower end to a portion of the supporting framework. Arms 35 and 36 are pivotally attached to the fixed frame members by means of a cross shaft 40 journaled at its ends in the frame members. Arm 36 may then be fixed to shaft 40 while arm 35 is free to pivot thereabout; allowing each arm to pivot independently of the other. If desired, arm 35 may additionally be provided with adjustable dog screws (not shown) in order that it may also be fixed to shaft 40 and allow both arms 35 and 36 to pivot in unison. Rider roll 37 is attached to the arms 35 and 36 by means of self aligning bearings 41, which allow the rider roll some degree of translational as well as rotative movement with respect to its axis. Roller 38 may similarly be provided with such bearings.

Figure 8:
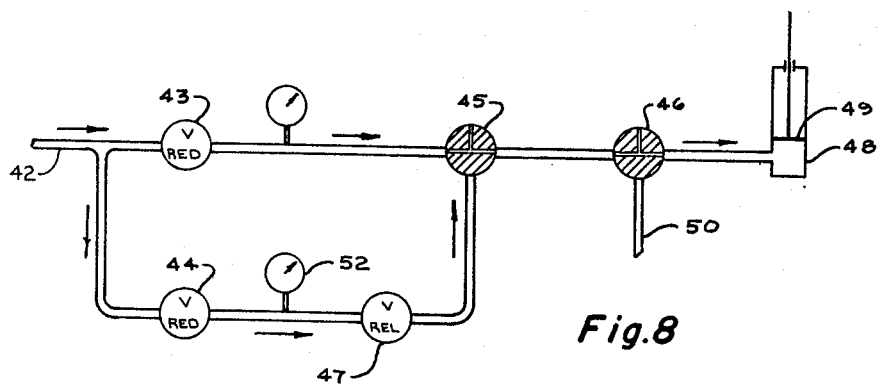
FIGURE 8 is a view of the pressure control circuit.
Figure 9:
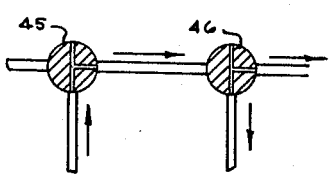
FIGURE 9 is a view of a portion of the circuit of FIGURE 8 showing a different position of the valves.
Figure 10:
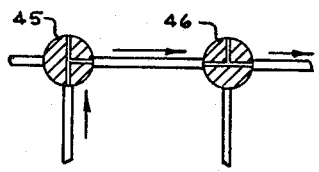
FIGURE 10 is a view similar to FIGURE 9 showing another position of the valves.

From an inspection of FIGURES 3 and 11, it will be apparent that with the piston and cylinders 39 exerting no force against the arms 35 and 36 the entire weight of the arms and rollers 37 and 38 will bear against the single faced board through the nip formed by rider roll 37 and applicator roll 30. Since, in a typical installation, this weight will generally result in a nip pressure in excess of the crushing strength of the board, means are provided for counterbalancing this weight and maintaining the nip pressure at a predetermined value intermediate that which would result in board crushing and that necessary to obtain adequate adhesive transfer from the applicator roll to the medium of the single faced board. This means comprises, as seen in FIGURES 3, and 8–11, the pistons and cylinders 39 and a constant pressure pneumatic or hydraulic circuit associated with each. The constant pressure circuit, as shown in FIGURE 8, comprises a high pressure line 42 which branches off and supplies high pressure fluid to each of the reducing valves 43 and 44. Reducing valve 43 reduces this pressure to a predetermined value which may then be conveyed through solenoid operated, three way valves 45 and 46 to one of the pistons and cylinders 39. Reducing valve 44 reduces the pressure in line 42 to a value below that effected by valve 43 and allows this lower pressure to pass through pressure relief valve 47 and thence, when they are properly positioned, through three way valves 45 and 46 to a piston and cylinder 39. The pressure in the line leading from valve 44 is set so that with valves 45 and 46 positioned to block off pressure from reducing valve 43 and allow pressure from valve 44 to enter the cylinder 48, the force exerted at the nip formed by rider roll 37 and applicator roll 30 is counterbalanced by the pistons and cylinders 39 to give the desired nip pressure. This pressure, as noted above, is that which is sufficient to obtain adequate adhesive transfer but yet not great enough to cause board crushing. The pressure from valve 43, however, is substantially greater and with valves 45 and 46 positioned as shown, the pressure in cylinder 48 is great enough to raise the assembly of arms 35 and 36 and rollers 37 and 38 for ready access to the interior of the applicating station 12. In order to provide a fully automatic operation, solenoid operated valves 45 and 46 may conveniently be actuated by means of a centrifugal switch sensing the speed of the process. In this manner, when the process is stopped the lifting pressure from reducing valve 43 passes directly through valves 45 and 46 to the bottom end of the cylinder 48 and moves the piston 49 upwardly to lift the rider roll 37. In this case, the third ports of valves 45 and 46 are both closed. As the process begins, valves 45 and 46 are energized through the centrifugal switch (not shown) and assume the positions shown in FIGURE 9. In this position the input from valve 43 to valve 45 is blocked and the pressure from valve 44 feeds through valve 45 and valve 46. The input side of valve 46, however, is now blocked and the pressure from cylinder 48 is allowed to vent through line 50 causing the rider roll to rapidly drop towards its operating position. Just before reaching this position, however, limit switch 51 is tripped by an arm (see FIGURE 3) de-energizing valve 46 so that the valves assume the position shown in FIGURE 10. In this position, the vent line 50 is again blocked and the preset pressure from valve 44 may now enter cylinder 48 to provide the counterbalancing force necessary to give the desired pressure at the nip formed by the rider roll 37 and applicator roll 39.

As an example of the above operation, assume that the total force exerted by the rider roll 37 at the nip is 1100 pounds. For a B flute type board it has been found that six pounds per lineal inch of nip (6 p.l.i.) is sufficient to give adequate adhesive transfer while about 8 p.l.i., crushing may be encountered. Selecting the median value of 7 p.l.i., therefore, it will be seen that with a board of 60 inches width, the 1100 pounds pressure at the nip should be reduced to 60×7=420 pounds. With rider roll 37 acting through a lever arm of 5 inches and piston and cylinders 39 acting through a lever arm of 30 inches, it will be seen that in order to obtain the desired nip pressure the cylinders must exert an upward force of $$\frac{1100-420\times 5}{30}=130 \text{ pounds}$$

or, 65 pounds per piston and cylinder. Assuming each piston 49 to have an area of 5 square inches, the pressure from reducing valve must be 65/5=13 p.s.i. in order to give a nip pressure of 7 p.l.i. On the other hand, if the pressure of reducing valve 43 is set at 30 p.s.i. it will be seen that more than enough force is exerted to raise the rider roll from the applicator roll when the process is stopped.

Since the proper nip pressure will vary with varying board widths, for convenience of operation reducing valve 44 should be of the adjustable type and pressure gauge 52 calibrated in inches of width of single faced board rather than p.s.i. With this arrangement, when it is desired to change the width of single face board to be run through the adhesive applicator station 12, the machine operator merely adjusts the reducing valve 44 until a value in inches corresponding to the width of the board to be processed is observed on the gauge 52. The correct line pressure to give the desired nip pressure for that width of board is then provided. In order to protect gauge 52 from any possible high pressure feedback in the circuit, a pressure relief valve 47 may be installed downstream thereof.

With the arrangement described above, it will be seen that if the caliper of board passing through the rider roll—applicator roll nip should increase, the pressure in cylinders 48 and the lines leading thereto will decrease. This decrease, however, is immediately compensated for by additional pressure being supplied through preset reducing valve 44 to the cylinders to maintain the nip pressure substantially constant. Conversely, should the caliper of board passing through the nip decrease, the pressure in cylinders 48 and associated supply circuit will increase. This pressure increase, however, is immediately vented through pressure relief valve 47 to again maintain the nip pressure at the desired value.

Figures 12, 13:
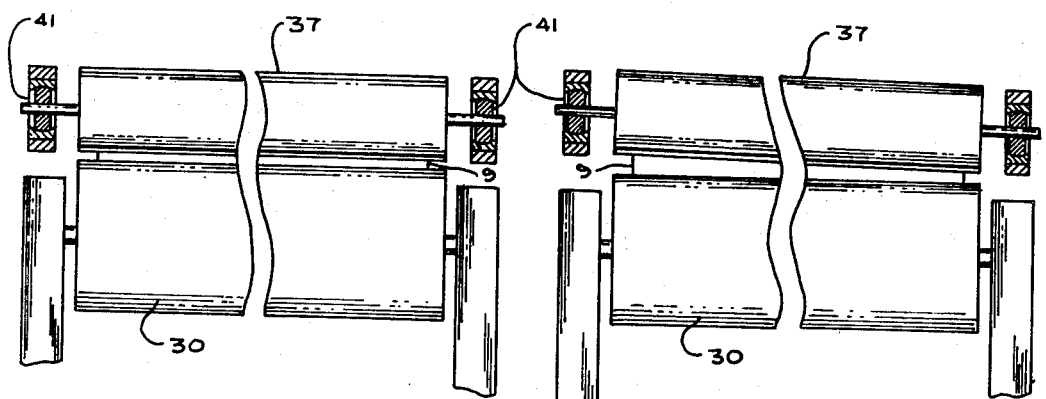
FIGURE 12 is a view of the rider roll and applicator roll showing one position thereof.
FIGURE 13 is another view of the rider roll and applicator roll showing a different position thereof.

In addition to caliper variations in the machine direction, it should be noted that a situation will often be encountered where one edge of the single face board is thicker than desired and tapers to a dimension at the opposite edge which is less than desired. With a fixed clearance nip this would result in possible crushing of the thicker edge of the board while the thinner edge would receive an inadequate supply of adhesive. By maintaining a constant pressure at the nip, however, and permitting each of the arms 35 and 36 to pivot independently of the other, constant pressure may be maintained in the cross machine as well as machine direction. Thus, as seen in FIGURES 12 and 13, as a board of constant transverse caliper passes between rider roll 37 and applicator roll 30, the two rolls will be substantially parallel and exert a substantially constant pressure throughout their length. However, as a board of varying caliper transversely thereof moves into the nip, the thicker edge of the board will tend to urge the end of the rider roll adjacent thereto upwardly while the thinner edge will tend to allow the roll to move downwardly at that edge. Due to the independent mounting of the arms 35 and 36 and the use of self aligning bearings 41, roll 37 is allowed to move translationally with respect to its axis and permit the constant pressure system to correctly equalize the pressure across the nip.

From the foregoing it will be apparent that applicant has devised means providing a unique degree of control over adhesive consumption in the manufacture of corrugated board. While certain specific examples have been described it will be obvious that modifications thereof will readily occur to those skilled in the art within the scope of the appended claims.

I claim:
1. A method of applying adhesive to a moving web comprising:
 (a) rotating an applicator roll having a plurality of cells formed in its surface at a speed such that the surface speed of said roll is substantially identical to the speed of a moving web in contact therewith,
 (b) applying adhesive to a portion of said roll in a quantity sufficient to cover the surface of said portion and fill the cells in said portion,
 (c) maintaining said surface of said roll free from contact with other than said web and said adhesive,
 (d) simultaneously removing said surface covering of adhesive and regulating the amount of adhesive in said cells by rotating a doctor roll adjacent to said applicator roll but spaced therefrom by a distance of .005 to .016 inch, and
 (e) pressing the adhesive free surface of said applicator roll against said web; whereby the adhesive in said cells is drawn therefrom and imprinted on said web.
2. The method of claim 1 further comprising:
 (a) maintaining said applicator roll free from contact with other than said adhesive and said web.

References Cited

UNITED STATES PATENTS

| | | | |
|---|---|---|---|
| 2,290,119 | 7/1942 | Pityo | 118—212 X |
| 2,290,200 | 7/1942 | Murch et al. | 118—212 X |
| 2,729,193 | 1/1956 | Scholl | 118—212 X |
| 2,741,215 | 4/1956 | Cady et al. | 118—212 X |
| 2,876,734 | 3/1959 | Nitchie | 118—249 |
| 3,036,927 | 5/1962 | Jerothe | 118—7 |
| 3,046,935 | 7/1962 | Wilson | 118—7 |
| 3,145,118 | 8/1964 | Mahoney | 118—249 X |
| 3,189,502 | 6/1965 | Little | 156—210 |

FOREIGN PATENTS

| | | |
|---|---|---|
| 644,789 | 7/1947 | Great Britain. |

MORRIS KAPLAN, *Primary Examiner.*

UNITED STATES PATENT OFFICE
CERTIFICATE OF CORRECTION

Patent No. 3,383,234          Dated May 14, 1968

Inventor(s) Willem A. Nikkel

It is certified that error appears in the above-identified patent and that said Letters Patent are hereby corrected as shown below:

Claim 1, clause (e) is amended to read as follows:

"pressing the web against the adhesive-free surface of said applicator roll whereby the adhesive in said cells is drawn therefrom and imprinted on said web"

Signed and sealed this 2nd day of November 1971.

(SEAL)
Attest:

EDWARD M. FLETCHER, JR.      ROBERT GOTTSCHALK
Attesting Officer              Acting Commissioner of Patents